United States Patent [19]

Grosskinsky et al.

[11] Patent Number: 4,477,424
[45] Date of Patent: Oct. 16, 1984

[54] CONTINUOUS PREPARATION OF HYDROXYLAMMONIUM SALTS

[75] Inventors: Otto-Alfred Grosskinsky; Elmar Frommer, both of Ludwigshafen, Fed. Rep. of Germany; Günther Rapp, late of Ludwigshafen, Fed. Rep. of Germany, by Ruth E. Rapp, legal representative; Erwin Thomas, Freinsheim, Fed. Rep. of Germany

[73] Assignee: BASF Aktiengesellschaft, Fed. Rep. of Germany

[21] Appl. No.: 344,614

[22] Filed: Feb. 1, 1982

[30] Foreign Application Priority Data

Feb. 28, 1981 [DE] Fed. Rep. of Germany ....... 3107702

[51] Int. Cl.$^3$ .............................................. C01B 21/20
[52] U.S. Cl. ..................................... 423/387; 423/388
[58] Field of Search ................................. 423/387, 388

[56] References Cited

U.S. PATENT DOCUMENTS 4,048,291 9/1977 El-Ghatta et al. .................. 423/388
4,192,856 3/1980 Rapp et al. .......................... 423/387

FOREIGN PATENT DOCUMENTS 968363 2/1953 Fed. Rep. of Germany .
945752 6/1957 Fed. Rep. of Germany .
956038 2/1958 Fed. Rep. of Germany .
920963 11/1961 Fed. Rep. of Germany .
1088037 10/1962 Fed. Rep. of Germany .
1193923 1/1967 Fed. Rep. of Germany .
1177118 4/1967 Fed. Rep. of Germany .
1567832 5/1970 Fed. Rep. of Germany .
2046197 8/1973 Fed. Rep. of Germany .

*Primary Examiner*—Edward J. Meros
*Assistant Examiner*—Wayne A. Langel
*Attorney, Agent, or Firm*—Keil & Witherspoon

[57] ABSTRACT

An improved process for the continuous preparation of hydroxylammonium salts by catalytic reduction of nitric oxide with hydrogen in a dilute aqueous solution of a mineral acid in the presence of a suspended noble metal catalyst at an elevated temperature in several reaction zones connected in series, wherein the improvement comprises maintaining a pH of <2.0 in the last reaction zone.

1 Claim, No Drawings

CONTINUOUS PREPARATION OF HYDROXYLAMMONIUM SALTS

The present invention relates to a process for the continuous preparation of hydroxylammonium salts by catalytic reduction of nitric oxide with hydrogen in a dilute aqueous solution of a mineral acid in the presence of a suspended noble metal catalyst at an elevated temperature in several reaction zones connected in series.

The preparation of hydroxylammonium salts by catalytic reduction of nitric oxide with hydrogen in dilute aqueous solutions of mineral acids in the presence of a suspended noble metal catalyst is a conventional process and is carried out industrially. A continuous procedure is described, for example, in German Pat. No. 1,177,118. In this procedure, an aqueous solution of mineral acid containing the suspended catalyst is passed through several stirred kettles connected in series, a mixture of nitric oxide and hydrogen is passed into each stirred kettle and a hydroxylammonium salt solution which contains catalyst is removed from the last stirred kettle. It has been found that a rise in pressure, with increased formation of nitrous oxide and nitrogen, and increased formation of ammonium salts frequently occur in the last stirred kettle. Apart from the fact that increased formation of gaseous by-products is undesirable, there is the danger of an explosive mixture being formed on increased formation of nitrous oxide, especially if the process is being carried out under superatmospheric pressure. Increased formation of ammonium salts is also undesirable, since the yield of hydroxylammonium salts falls and moreover unwanted quantities of ammonium salts must be separated off during further processing.

It is an object of the present invention to carry out continuous preparation of hydroxylammonium salts in several reaction zones, connected in series, in such a way that increased formation of by-products is avoided, even in the last reaction zone.

We have found that this object is achieved by a process for the continuous preparation of hydroxylammonium salts by catalytic reduction of nitric oxide with hydrogen in a dilute aqueous solution of a mineral acid in the presence of a suspended noble metal catalyst at an elevated temperature in several reaction zones connected in series, wherein a pH of $<2.0$ is maintained in the last reaction zone.

The novel process has the advantages that increased formation of by-products is avoided in the last reaction zone, that no explosive off-gas mixtures are formed when it is carried out under superatmospheric pressure and, finally, that a sudden rise in pressure, which would adversely effect the preceding reaction zones also, is excluded.

As a rule, hydrogen and nitric oxide are used in a molar ratio of from 1.5 : 1 to 6 : 1. Particularly good results are obtained if a molar ratio of hydrogen to nitric oxide of from 3.5 : 1 to 5 : 1 is maintained in the individual reaction zones.

In general, the mineral acids used are non-reducing strong mineral acids, such as perchloric acid, nitric acid; sulfuric acid and phosphoric acid. Their acid salts, for example ammonium bisulfate, can also be used. Sulfuric acid and/or ammonium bisulfate are particularly preferred. As a rule, from 4 to 6 N aqueous solutions of the acids are used, and the acid concentration is allowed to decrease in the course of the reaction.

The reaction is advantageously carried out at from 30° to 80° C., in particular from 40° to 60° C., and as a rule under atmospheric pressure or superatmospheric pressure, for example under a pressure of not more than 300 bar.

Platinum catalysts are advantageously used as the noble metal catalysts, and are generally applied to carriers. Platinum on a carbon carrier, in particular on graphite, has proved especially suitable. The catalysts are used in finely divided form as a suspension, and preferably contain from 0.2 to 5 percent by weight of platinum. The catalysts advantageously also contain one or more elements of the 5th and/or 6th groups of the periodic table with an atomic weight of $>31$. Only phosphorus has an atomic weight of 31), as well as lead and/or mercury as poisons. Suitable catalysts and their preparation has been disclosed, for example, in German Pat. Nos. 1,088,037, 920,963, 956,038 and 945,752.

The reaction is carried out in several reaction zones connected in series. From 2 to 10, in particular from 4 to 8, reaction zones are as a rule used, and these advantageously communicate with one another. Advantageously, fresh dilute aqueous solution of mineral acid containing the suspended catalyst is fed to the first reaction zone, and then flows through the individual reaction zones in succession, the content of hydroxylammonium salt progressively increasing as the acid is consumed. The reaction mixture is removed from the last reaction zone at a rate corresponding to that at which fresh aqueous acid is fed into the first reaction zone. Advantageously, the reaction zones are each separately charged with a mixture of nitric oxide and hydrogen, with the exception of the first zone, and the off-gases formed are collected and introduced into the first reaction zone, advantageously after replenishing with nitric oxide.

It is an essential characteristic of the invention that a pH of $<2.0$, advantageously of from 0.9 to 1.8, is maintained in the last reaction zone, i.e. in the reaction mixture substantially consisting of an aqueous solution of hydroxylammonium salts, ammonium salts, acid, supported catalyst and dissolved nitric oxide. The pH in the last reaction zone is brought to this level, for example, by increased or reduced addition of nitric oxide and hydrogen, or by the batchwise or continuous addition of further acid, which is advantageously controlled via the pH in the last reaction zone. It has proved particularly advantageous to control the flow of fresh aqueous mineral acid into the first reaction zone via the pH in the last reaction zone. If sulfuric acid is used, this pH is advantageously kept at from 1.0 to 1.5. Control of the flow of fresh mineral acid via the pH in the last reaction zone is noteworthy in that, as a result of the long residence time, no rapid effect on the pH of the last reaction zone was to be expected. Rather, it was to be assumed that wide variations in the pH would occur in the last reaction zone. The last-mentioned procedure also has the particular advantage that on the one hand the disadvantages mentioned initially are avoided, and on the other hand an excessive residual content of mineral acid, which is undesirable for the further processing of the hydroxylammonium salt solution, is also avoided.

Hydroxylammonium salts which are obtained by the process of the invention can be used for the preparation of cyclohexanone oxime, a starting compound for the preparation of caprolactam.

The Example which follows illustrates the process of the invention.

EXAMPLE

Eight reaction vessels connected in series are each charged with 6,000 l of 4.5 N sulfuric acid and 150 kg of a platinum-on-graphite catalyst containing 1 percent by weight of platinum. With the connecting lines closed, the reaction vessels are charged with a mixture of hydrogen and nitric oxide in a molar ratio of 1.7:1, so that the concentration of free sulfuric acid decreases from vessel to vessel. The connecting lines between the individual reaction vessels are then opened, and 4.5 N sulfuric acid and platinum catalyst are introduced into the first reactor, whilst the corresponding amount of hydroxylammonium sulfate solution and catalyst is removed from the eighth reactor. The catalyst is filtered off and added to the fresh sulfuric acid. Nitric oxide and hydrogen are added separately to each of reactors 2 to 8, and the off-gasses are collected and, after being replenished with nitric oxide, are recycled to reactor 1. The reaction is carried out at 40° C. and under 1 bar. Reaction mixture is continuously removed from reactor 8, via an external loop, and its pH is measured. As soon as the pH reaches 1.3, the amount of sulfuric acid flowing into reactor 1 is increased by means of a regulator connected to the pH meter. When the pH of the reaction mixture in reactor 8 reaches 1.1, the amount of sulfuric acid flowing into reactor 1 is reduced via the regulator. The off-gas formed in reactor 8 contains 10% by volume of nitrous oxide, and the reaction mixture flowing out contains 0.1 percent by weight of ammonium sulfate.

If the pH in reactor 8 rises to 2.0, the content of nitrous oxide in the off-gas is increased to 15% by volume and the content of ammonium sulfate in the reaction solution discharged is increased to 0.2 percent by weight.

We claim:

1. In a process for the continuous preparation of hydroxylammonium salts by the catalytic reduction of nitric oxide with hydrogen in a dilute aqueous solution of a mineral acid in the presence of a suspended noble metal catalyst at an elevated temperature in from 4 to 8 reaction zones connected in series, the improvement comprising: continuously monitoring the pH in the last reaction zone and, in response thereto, adding sufficient fresh aqueous acid to the first reaction zone to maintain the pH in the last reaction zone between 0.9 and 1.8, whereby the increased formation of by-products and an excessive content of mineral acid is avoided in the last reaction zone.

* * * * *